United States Patent
Heiss

(10) Patent No.: US 7,151,748 B1
(45) Date of Patent: Dec. 19, 2006

(54) METHOD OF DETERMINING CELL LOSS PRIORITY INFORMATION

(75) Inventor: Herbert Heiss, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 936 days.

(21) Appl. No.: 10/048,014

(22) PCT Filed: Jul. 31, 2000

(86) PCT No.: PCT/DE00/02521

§ 371 (c)(1),
(2), (4) Date: Jun. 10, 2002

(87) PCT Pub. No.: WO01/10085

PCT Pub. Date: Feb. 8, 2001

(30) Foreign Application Priority Data

Jul. 29, 1999 (DE) ................................. 199 35 787
Aug. 6, 1999 (DE) ................................. 199 37 244

(51) Int. Cl.
*H04L 3/14* (2006.01)

(52) U.S. Cl. ............................... 370/241.1; 370/395.42

(58) Field of Classification Search ............. 370/230.1, 370/359, 395.42, 395.43, 395.71, 395.72
See application file for complete search history.

(56) References Cited

U.S. PATENT DOCUMENTS

| 5,920,558 | A | * | 7/1999 | Saito et al. ................. 370/359 |
| 5,940,375 | A | | 8/1999 | Soumiya et al. |
| 5,953,317 | A | * | 9/1999 | Ogasawara et al. ......... 370/232 |
| 6,246,687 | B1 | * | 6/2001 | Siu ......................... 370/395.71 |
| 6,301,226 | B1 | * | 10/2001 | Lincoln ....................... 370/229 |
| 6,438,107 | B1 | * | 8/2002 | Somiya et al. ............... 370/233 |
| 6,466,997 | B1 | * | 10/2002 | Ross et al. .................... 710/48 |
| 6,483,809 | B1 | * | 11/2002 | Shimada .................. 370/241.1 |
| 6,483,839 | B1 | * | 11/2002 | Gemar et al. ........... 370/395.42 |
| 6,628,614 | B1 | * | 9/2003 | Okuyama et al. ......... 370/230.1 |
| 6,751,195 | B1 | * | 6/2004 | Watanabe ................. 370/230.1 |

FOREIGN PATENT DOCUMENTS

JP          10-135975          5/1998

OTHER PUBLICATIONS

Technical Committee Traffic Management Specification Version 4.1 AF-TM-0121.000 Final Ballot, Mar. 1999.
ITU Integrated Services Digital Network Maintenance Principles—B-ISDN Operation and Maintenance principles and Functions, Nov. 1995.
ITU Series I: Integerated Services Digital Network—Traffic Control and Congestion Control in B-ISDN, Aug. 1996.
Kalyanaraman, "An Update on ATM Traffic Management" ATM Forum Perspectives, IEEE Network, p. 5-7, May/Jun. 1998.

* cited by examiner

*Primary Examiner*—Hassan Kizou
*Assistant Examiner*—Albert T. Chou
(74) *Attorney, Agent, or Firm*—Morrison & Foerster LLP

(57) ABSTRACT

In an ATM communication system or communication terminal the cell loss priority information (CLP) in operation, maintenance, administration and resource-management cells (OAM) that are inserted between cells (DP1, DP2) of a virtual connection (GFR-Vx) with a guaranteed frame rate, is detected by determining the cell loss priority information (CLP) of the cell (DP1) of the respective virtual connection (GFR-Vx) which is actually to be transmitted and by inserting said information in the operation, maintenance, administration and resource-management cells (OAM).

11 Claims, 1 Drawing Sheet

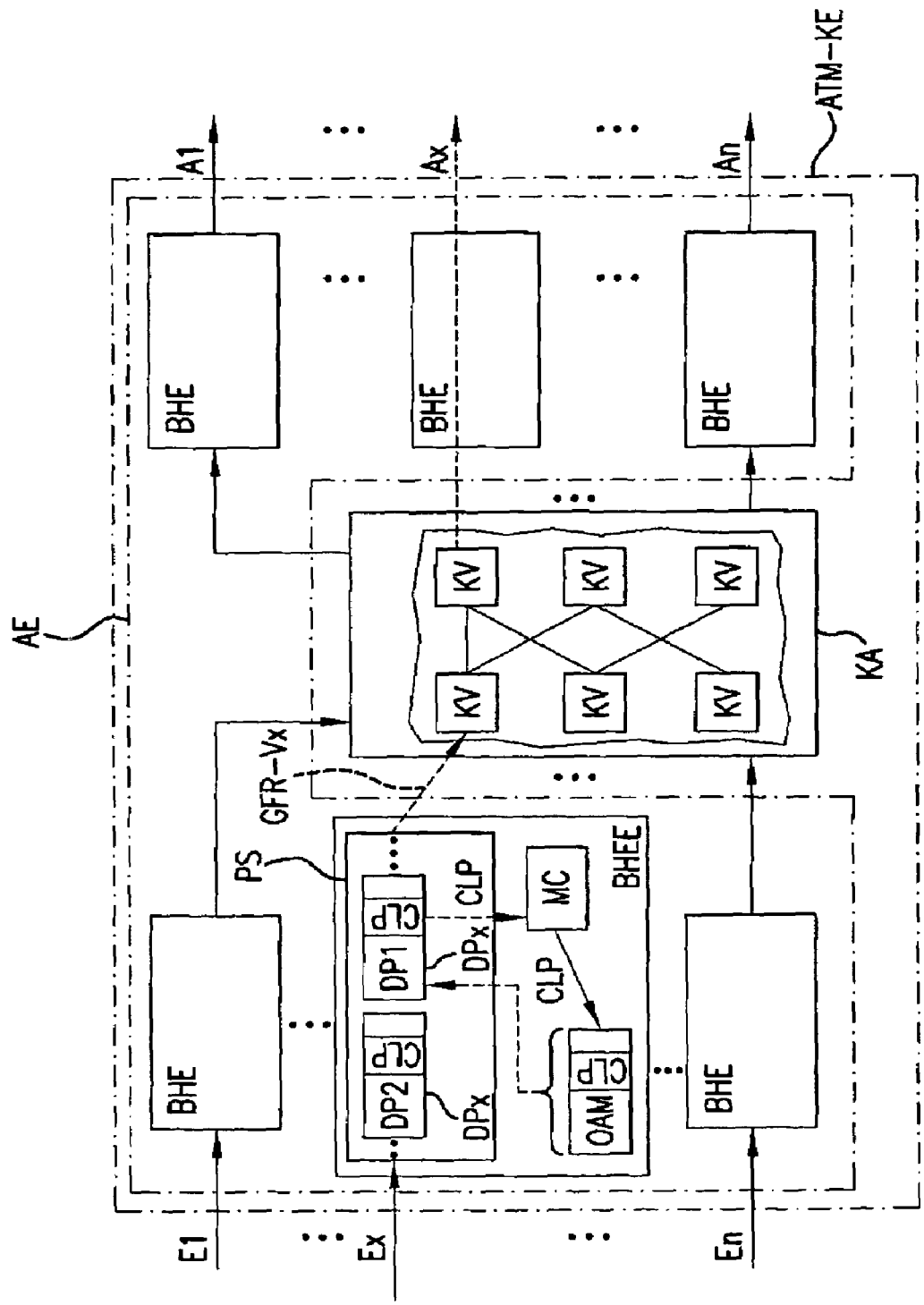

1

METHOD OF DETERMINING CELL LOSS PRIORITY INFORMATION

CLAIM FOR PRIORITY

This is a U.S. national stage of PCT/DE00/02521 filed Jul. 31, 2000 which claims priority to German application 19935787.0 and 19937244.6 filed Jul. 29, 1999 and Aug. 6, 1999, respectively.

TECHNICAL FIELD OF THE INVENTION

A method to determine cell loss priority information in operation administration maintenance cells and resource management cells.

BACKGROUND OF THE INVENTION

Existing and future packet-oriented communications networks, for example ATM (asynchronous transfer mode) communications networks, provide a variety of monitoring strategies to monitor variable and fixed and guaranteed transfer rates of ATM cells and ATM cells belonging to a framework or transfer framework. In particular, in the case of ATM communications networks, loss priorities are assigned to transmitting ATM cells and, based on the loss priorities and based on loss priorities decisions, are made concerning the retransfer of the respective ATM cells in a communication system. In this connection, a monitoring procedure is used to decide on the retransfer or rejection of an ATM cell to the respective communications system based on the assigned loss priorities. In this way, assigning loss priorities to individual cells establishes which ATM cells can be discarded in the event of overload within an ATM communication system without the loss of real time information that is relevant to the connection.

Also, the "Traffic Management 4.1" proposal of the 1999 ATM Forum defines various traffic classes and connection types. These include constant bit rate (CBR) connections, variable bit rate (VBR) connections, available bit rate (ABR) connections, unspecified bit rate (UBR) connections and guaranteed frame rate (GFR) connections.

The constant bit rate connection type is used for virtual links, for which a given constant transmission bandwidth must be provided for the time in which a virtual link exists.

The variable bit rate connection type is defined for virtual links with variable and/or changeable transmission rate requirements in the "Traffic Management 4.1" of the 1999 ATM Forum proposal.

The available bit rate connection type makes possible applications that do not have assigned a specific transmission bandwidth. The applications can use the currently possible transmission bandwidths within the ATM communication network, whereby the respective available bit rate connection must be assigned a maximum and a minimum transmission rate in each case and is not allowed to go above or fall below these limits.

The unspecified bit rate connection type is not assigned any fixed cell loss information or cell delay times of the respective virtual connection. Instead, the unspecified bit rate connection type represents a best effort service class comparable to the type of service class that in practice is provided for Internet applications.

The guaranteed frame rate connection type is provided to support delay-tolerant applications that are guaranteed a narrow transmission bandwidth and which can be granted additional transmission capacity freed up during data traffic.

In a guaranteed frame rate connection type, a frame's information is packed into ATM cells and all ATM cells of a given frame are assigned the same loss priority or cell loss priority information using cell loss priority bits (CLP bits), i.e., the header of the ATM cells assumes the same value of the CLP bit used to control overload in ATM communications systems as for the ATM cells of a frame of a virtual guaranteed frame rate connection.

If, for example, a network node or an ATM communications system are overloaded, it could result in all of the ATM cells belonging to the network node or an ATM communications system being discarded. Experts in the field know of a number of different anti-overload strategies, such as frame discard, see the 1999 ATM Forum "Traffic Management 4.1" proposal. The above can avoid that additional ATM cells of the frame are transmitted via the provided transmission after loss or reception of a faulty ATM cell, although the frame information would not be received error-free at the end of the transmission line. The above would result in an unnecessary load on the ATM communications system. That is why in the event of an overloaded transmission line, it is especially important to remove the additional ATM cells of a frame as quickly and effectively as possible. If the ATM cells of a frame show different loss priorities, this frame will not support a quality of service, i.e., if an overload situation occurs some or all of the frame's ATM cells can be discarded in the network node or in the ATM communications system.

We also know ITU-T standards I.610 and I.371 provided solely for the operation, maintenance and administration and also resource management of ATM cells and control cells within the ATM communications system. Such ATM cells are called operation administration maintenance (OAM) cells and resource management cells, respectively. These can be inserted into the continuous ATM cell stream by ATM communications transmitters and an ATM communications system. When inserting OAM cells or RM cells into the cell stream, it is especially important to ensure the quality of service for the frames to be sent.

SUMMARY OF THE INVENTION

The invention is to ensures the quality of service when inserting operation administration maintenance cells and resource management cells.

In one embodiment of the invention, in order to determine cell loss priority information in operation, maintenance, administration and/or resource management cells that are inserted between virtually linked cells with guaranteed frame rate within an ATM communications system and/or an ATM communications system, cell loss priority information of the cell to be sent directly of the relevant virtual connection is determined and inserted into the operation, maintenance, administration and/or resource management cell as current cell loss priority information. Consequently, all ATM cells, including the inserted operation, maintenance, administration and/or resource management cells, include the same cell loss priority information and the quality of service is ensured for each frame in an advantageous manner and/or the discarding of a complete frame and/or single ATM cells of a frame due to the insertion of operation, maintenance, administration and/or resource management cells with different cell loss priority information is avoided. Using the procedure according to the invention, existing monitoring algorithms can be advantageously continue to be used because as a rule the operation, maintenance, administration and/or resource management cells inserted into the cell stream for the overload control of a network node and/or an ATM communications system do not have to be treated differently.

According to an additional embodiment of the invention, the respective cells are assigned different loss priorities by the cell loss priority information and the cell loss priority information is created by a one-bit piece of information. The allocation of different loss priorities using the cell loss priority information and creating a one bit piece of information is coordinated with the "Traffic Management 4.1" proposal of the 1999 ATM Forum.

According to another embodiment of invention, the operation, maintenance, administration and/or resource management cells take the form of operation administration maintenance (OAM) cells and resource management (RM) cells according to standard ITU-T I.160 and ITU-T I.371.

In still another embodiment of the invention, in the absence of a cell of the virtual connection to be transmitted directly, the virtual link inserts a given standard cell loss priority information into the operation, maintenance, administration and/or resource management cell as current cell loss priority information. On this point, advantageously, the standard cell loss priority information represented by the CLP bit assumes the logical value "0", i.e., that there is a low probability—due to the standard "0" assigned to the CLP bits in the ATM cells—that these ATM cells will be discarded in the event of an overload situation, for example, within an ATM communications system.

According to another embodiment of the invention, after the transmission of the last cell of a frame in a virtual link during the insertion of an operation, maintenance, administration and/or resource management cell, the cell loss priority information of the cell to be sent directly in the following frame of the virtual link is determined and inserted into the operation, maintenance, administration and/or resource management cell as current cell loss priority information. Advantageously, the operation, maintenance, administration and/or resource management cell inserted after the sending of the last cell will be transmitted together with the cells of the following frame.

BRIEF DESCRIPTION OF THE DRAWINGS

The procedure according to the invention is explained below, in which:

FIG. 1 illustrates a block diagram of an ATM communications system using an asynchronous transfer mode.

DETAILED DESCRIPTION OF THE PREFERRED EMBODIMENTS

FIG. 1 illustrates a block diagram of an ATM communications system ATM-KE using an asynchronous transfer mode, in which a majority of feeder lines E1 through En and a majority of customer lines A1 through An are connected using service units AE. Of the above, for example, feeder lines E1 through En and customer lines A1 through An and one of several possible service units AE are represented. Via the feeder lines E1 through En and customer lines A1 through An, ATM cells DPx are transmitted via virtual links using asynchronous transfer mode, whereby variable, fixed or guaranteed transfer rates are provided for the transmittal of the ATM cells DPx via the virtual links. In the block diagram, a virtual GFR connection GFR-Vx is represented by a broken line and its feeder line Ex and/or its customer line Ax. In a guaranteed frame rate (GFR) link, a frame's information is packed in ATM cells and ATM cells DPx of a frame are assigned the same loss priority and/or cell loss priority information CLP using cell loss priority bits (CLP-Bit).

The service unit AE includes a number of processing devices BHE, whereby each of the feeder lines E1 through En and the customer lines A1 through An is assigned to a processing device BHE.

To illustrate the procedure according to the invention, FIG. 1 shows, for example, the feeder-processing device BHEE assigned to the virtual GFR link GFR-Vx, which is connected to the feeder network Ex. The ATM cells DPx sent in the virtual GFR link GFR-Vx are transmitted to the feeder-processing device BHEE of service unit AE. Then the ATM cells DPx of the virtual GFR link GFR-Vx are sent to the switching network KA of the ATM communications system ATM-KE, whereby a multi-level structure of interconnected switching matrices KV is shown in FIG. 1, as an example, for switching network KA. However, other single- or multi-stage switching networks can be provided. Then the ATM cells DPx of the virtual GFR link GFR-Vx is relayed by switching network KA to the customer line AX by a processing device BHE connected to the customer lines A1 through An.

The processing devices BHE/BHEE are supplied with a storage unit PS and a micro controller MC, whereby, for example, the storage unit PS and the microcontroller MC of the feeder processing device BHEE of the virtual GFR link GFR-Vx is represented in FIG. 1. When an ATM cell DPx of a frame of the virtual GFR link GFR-Vx arrives at the ATM communications system ATM-KE, the ATM cell DPx is forwarded to the feeder processing device BHEE of the service unit AE where it is temporarily stored in storage unit PS. FIG. 1 shows an example of a first and second ATM cell DP1, DP2 of the virtual GFR link GFR-Vx temporarily stored in the storage unit PS, whereby the first ATM cell DP1 was temporarily stored in the storage unit PS and is therefore provided for direct transmission to the switching network KA. If the insertion of an OAM or RM cell OAM into the cell stream of the virtual GFR link GFR-Vx is provided by the ATM communications system ATM-KE, it is assumed that there is one OAM and/or RM cell OAM in the ATM communications system ATM-KE and/or in the feeder-processing device BHEE of the service unit AE. Further, the cell loss priority information CLP transmitted in the temporarily stored first ATM cell DP1 from the next ATM cell DPX to be sent to the virtual GFR link GFR-Vx is read and/or copied using the microcontroller MC as part of a reading cycle and inserted into the created OAM and/or RM cell OAM and temporarily stored in the storage unit PS. FIG. 1 shows an example of an OAM cell AOM in which using the microcontroller MC, the cell loss priority information CLP of the temporarily stored first ATM cell DP1 is entered and/or copied. The modified OAM and/or RM cell OAM is then inserted in the cell stream of the virtual GFR link GFR-Vx, for example, as shown in FIG. 1, between the first and second, temporarily stored ATM cell DP1, DP2. If there is no ATM cell DP1, DP2 of the GFR link GFR-Vx temporarily stored in the storage unit and/or if the last ATM cell DP1,DP2 of the frame of the virtual GFR link GFR-Vx was already sent, the OAM and/or RM cell OAM to be inserted will be given the logical value "0" standard cell loss priority information and inserted and/or copied. After transmitting the first ATM cell DP1, the inserted OAM cell OAM will be sent to the network KA and switched.

The respective ATM cell DPx and/or the inserted OAM and/or RM cell OAM will be sent to the processing device BHE connected to the consumer line Ax and forwarded to the consumer line Ax by the processing device BHE.

What is claimed is:

1. A method to determine cell loss priority information in operation administration maintenance cells and resource management cells, comprising:

inserting the administration maintenance and resource management cells between cells of a virtual link with a guaranteed frame rate within an ATM communications system and/or ATM communications terminal equipment; and determining the cell loss priority information of the cell to be transmitted directly to the respective virtual link, and inserting the cell loss priority information into the operation administration maintenance and/or resource management cells as current cell loss priority information, wherein each cell of a frame has a same cell loss priority before inserting and after determining.

2. The method according to claim 1, wherein the cell loss priority information of the respective cell can be assigned different loss priorities.

3. The method according to claim 1, wherein the cell loss priority information comprises a one-bit piece of information.

4. The method according to claim 1, wherein the operation administration maintenance and resource management cells are structured as operation administration maintenance and resource management cells according to standard ITU-T I.610 and ITU-T I.371.

5. The method according to claim 1, wherein in the absence of a cell to be transmitted directly, the virtual link inserts a given standard cell loss priority information into the operation, maintenance, administration and/or resource management cell as current cell loss priority information.

6. The method according to claim 2, wherein the cell loss priority information comprises a one-bit piece of information.

7. The method according to claim 2, wherein the operation administration maintenance and resource management cells are structured as operation administration maintenance and resource management cells according to standard ITU-T I.610 and ITU-T I.371.

8. The method according to claim 3, wherein the operation administration maintenance and resource management cells are structured as operation administration maintenance and resource management cells according to standard ITU-T I.610 and ITU-T I.371.

9. The method according to claim 2, wherein in the absence of a cell to be transmitted directly, the virtual link inserts a given standard cell loss priority information into the operation, maintenance, administration and/or resource management cell as current cell loss priority information.

10. The method according to claim 3, wherein in the absence of a cell to be transmitted directly, the virtual link inserts a given standard cell loss priority information into the operation, maintenance, administration and/or resource management cell as current cell loss priority information.

11. The method according to claim 4, wherein in the absence of a cell to be transmitted directly, the virtual link inserts a given standard cell loss priority information into the operation, maintenance, administration and/or resource management cell as current cell loss priority information.

* * * * *